United States Patent
Yokoi et al.

(10) Patent No.: US 9,427,825 B2
(45) Date of Patent: Aug. 30, 2016

(54) DEVELOPING DEVICE, BLADE ASSEMBLY, AND DEVELOPING DEVICE MANUFACTURING METHOD

(71) Applicant: Brother Kogyo Kabushiki Kaisha, Nagoya-shi, Aichi-ken (JP)

(72) Inventors: Junichi Yokoi, Nagoya (JP); Hikaru Yoshizumi, Handa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 345 days.

(21) Appl. No.: 14/230,674

(22) Filed: Mar. 31, 2014

(65) Prior Publication Data
US 2015/0090701 A1    Apr. 2, 2015

(30) Foreign Application Priority Data
Sep. 30, 2013    (JP) .................................. 2013-205679

(51) Int. Cl.
| | |
|---|---|
| *B23K 26/08* | (2014.01) |
| *B23K 26/21* | (2014.01) |
| *B23K 26/22* | (2006.01) |
| *B23K 26/26* | (2014.01) |

(52) U.S. Cl.
CPC ............... *B23K 26/22* (2013.01); *B23K 26/08* (2013.01); *B23K 26/21* (2015.10); *B23K 26/244* (2015.10); *B23K 26/26* (2013.01); *B23K 2201/20* (2013.01)

(58) Field of Classification Search
CPC ....... B23K 26/08; B23K 26/21; G03G 21/16
USPC ........................................ 219/121.61, 121.64
See application file for complete search history.

(56) References Cited

U.S. PATENT DOCUMENTS

| | | |
|---|---|---|
| 6,175,708 B1 | 1/2001 | Ohashi et al. |
| 2001/0031158 A1 | 10/2001 | Yokomori et al. |
| 2004/0120734 A1 | 6/2004 | Okamoto |
| 2005/0025531 A1* | 2/2005 | Takashima ......... G03G 15/0812 399/284 |
| 2006/0024085 A1 | 2/2006 | Sato et al. |
| 2008/0118280 A1 | 5/2008 | Han et al. |
| 2009/0014912 A1* | 1/2009 | Ikeda ..................... B29C 33/64 264/299 |
| 2009/0188897 A1 | 7/2009 | Margairaz et al. |
| 2009/0310628 A1 | 12/2009 | Yamazaki |
| 2012/0272611 A1 | 11/2012 | Tsukimoto et al. |

(Continued)

FOREIGN PATENT DOCUMENTS

| | | |
|---|---|---|
| EP | 1394629 A1 | 3/2004 |
| GB | 2239205 A | 6/1991 |

(Continued)

OTHER PUBLICATIONS

Nov. 13, 2015—(US) Non-Final Office Action—U.S. Appl. No. 14/230,755.

(Continued)

*Primary Examiner* — Samuel M Heinrich
(74) *Attorney, Agent, or Firm* — Banner & Witcoff, Ltd.

(57) ABSTRACT

A method for welding a developing blade to a supporting member may include increasing a relative movement speed of a welding laser and a developing blade, along a moving direction. The method may include maintaining, upon the welding laser reaching the developing blade, the relative movement speed and initiating irradiation of the welding laser toward the developing blade and the supporting member.

8 Claims, 7 Drawing Sheets

(56) References Cited

U.S. PATENT DOCUMENTS

2013/0170876 A1 7/2013 Brown et al.
2013/0232749 A1 9/2013 Bruck et al.

FOREIGN PATENT DOCUMENTS

| GB | 2342881 A | 4/2000 |
|---|---|---|
| JP | 57-78574 A | 5/1982 |
| JP | 2001-356592 A | 12/2001 |
| JP | 2003145932 A | 5/2003 |
| JP | 2006-145932 A | 6/2006 |
| JP | 2008290083 A | 12/2008 |

OTHER PUBLICATIONS

Feb. 23, 2015—(US) Non-Final Office Action—U.S. Appl. No. 14/230,755.
European Search Report issued Feb. 18, 2015 for European Application No. 14186531.1.
Feb. 10, 2015—(US) Non-Final Office Action—U.S. Appl. No. 14/230,916.
Feb. 11, 2015—(US) Non-Final Office Action—U.S. Appl. No. 14/230,502.
European Search Report issued Mar. 20, 2015 in European Application No. 14186524.6.
Tritium: "Solar Panel Tig welding" Retrieved from the Internet: URL: http://weldingweb.com/showthread.php?57437?Solar?Panel?Tig?welding&p=523926#post523926 last visited on May 21, 2015.
Jun. 3, 2015—(US) Notice of Allowance—U.S. Appl. No. 14/230,502.
Jun. 5, 2015—(US) Notice of Allwwance—U.S. Appl. No. 14/230,916.
Jun. 26, 2015—(US) Final Office Action—U.S. Appl. No. 14/230,755.
Sep. 11, 2015—(US) Notice of Allowance—U.S. Appl. No. 14/230,502.

* cited by examiner

DEVELOPING DEVICE, BLADE ASSEMBLY, AND DEVELOPING DEVICE MANUFACTURING METHOD

CROSS-REFERENCE TO RELATED APPLICATION

This application claims priority from Japanese Patent Application No. 2013-205679, filed on Sep. 30, 2013, which is incorporated herein by reference in its entirety.

TECHNICAL FIELD

Aspects disclosed herein relate to a blade assembly in which a blade is joined to a supporting member by welding, a developing device using the blade assembly, and a manufacturing method of the developing device.

BACKGROUND

Conventionally, there has been an electrophotographic image forming apparatus that includes a developing device including a developing roller and a blade assembly for regulating a thickness of a developer layer held on the developing roller. Further, there has been known a blade assembly that includes a blade that contacts the developing roller and a supporting member that holds the blade in an overlapping manner.

In the blade assembly, the blade and the supporting member are welded to each other at a plurality of locations along the blade in an extended dimension of the blade. Therefore, the blade is formed with a plurality of weld marks that are aligned in the extended dimension of the blade.

SUMMARY

In some cases, to weld the blade and the supporting member to each other as described above, for example, a laser beam is irradiated onto the blade while the laser beam is moved with respect to the blade in the extended dimension of the blade. While the laser beam is moved, a moving speed of the laser beam at the start of and at the end of the movement may become slower than the moving speed of the laser beam during the period other than the start of and the end of the movement. Thus, weld marks formed on the blade at the start of and at the end of the movement may be larger in size than the other weld marks formed during the period other than the start of and the end of the movement.

Variations in size of the weld marks occurring depending on the locations may cause large variations in pressure contact between the blade and the developing roller.

Accordingly, for example, aspects of the disclosure provide for a developing device, a blade assembly, and a developing device manufacturing method in which quality of the blade assembly may be improved. According to the aspects of the disclosure, a method for welding a developing blade to a supporting member may include increasing a relative movement speed of a welding laser and a developing blade, along a moving direction. The method may include maintaining, upon the welding laser reaching the developing blade, the relative movement speed and initiating irradiation of the welding laser toward the developing blade and the supporting member.

According to the other aspects of the disclosure, a method for welding a developing blade to a supporting member, may include forming, by a welding laser of a welding apparatus, a first weld mark at a first position on the developing blade to connect the developing blade to the supporting member, wherein the first weld mark is an initial weld mark from an edge of the developing blade in a movement direction of the welding laser, and wherein the first weld mark is formed with a first width in a direction perpendicular to the movement direction of the welding laser; and forming a second weld mark at a second position of the developing blade to connect the developing blade to the supporting member, wherein the second position is a central position along the developing blade in the movement direction of the welding laser, and wherein the second weld mark is formed with a second width in the direction perpendicular to the movement direction of the welding laser, wherein the first width is between 0.8 and 1.2, inclusive, times as large as the second width.

According to the aspects of the disclosure, the weld marks formed on the blade or on the blade and the supporting member may have substantially the same size, thereby improving the quality of the blade assembly.

This summary is not intended to identify critical or essential features of the disclosure, but instead merely summarizes certain features and variations thereof. Other objects, features, and advantages will be apparent to persons of ordinary skill in the art from the following detailed description of the disclosure and the accompanying drawings.

DESCRIPTION OF THE DRAWINGS

Aspects of the disclosure are illustrated by way of example and not by limitation in the accompanying figures in which like reference characters indicate similar elements.

DETAILED DESCRIPTION

For a more complete understanding of the present disclosure, needs satisfied thereby, and the objects, features, and advantages thereof, reference now is made to the following descriptions taken in connection with the accompanying drawings. Hereinafter, illustrative embodiments of the disclosure will be described in detail with reference to the accompanying drawings.

Figure 1:
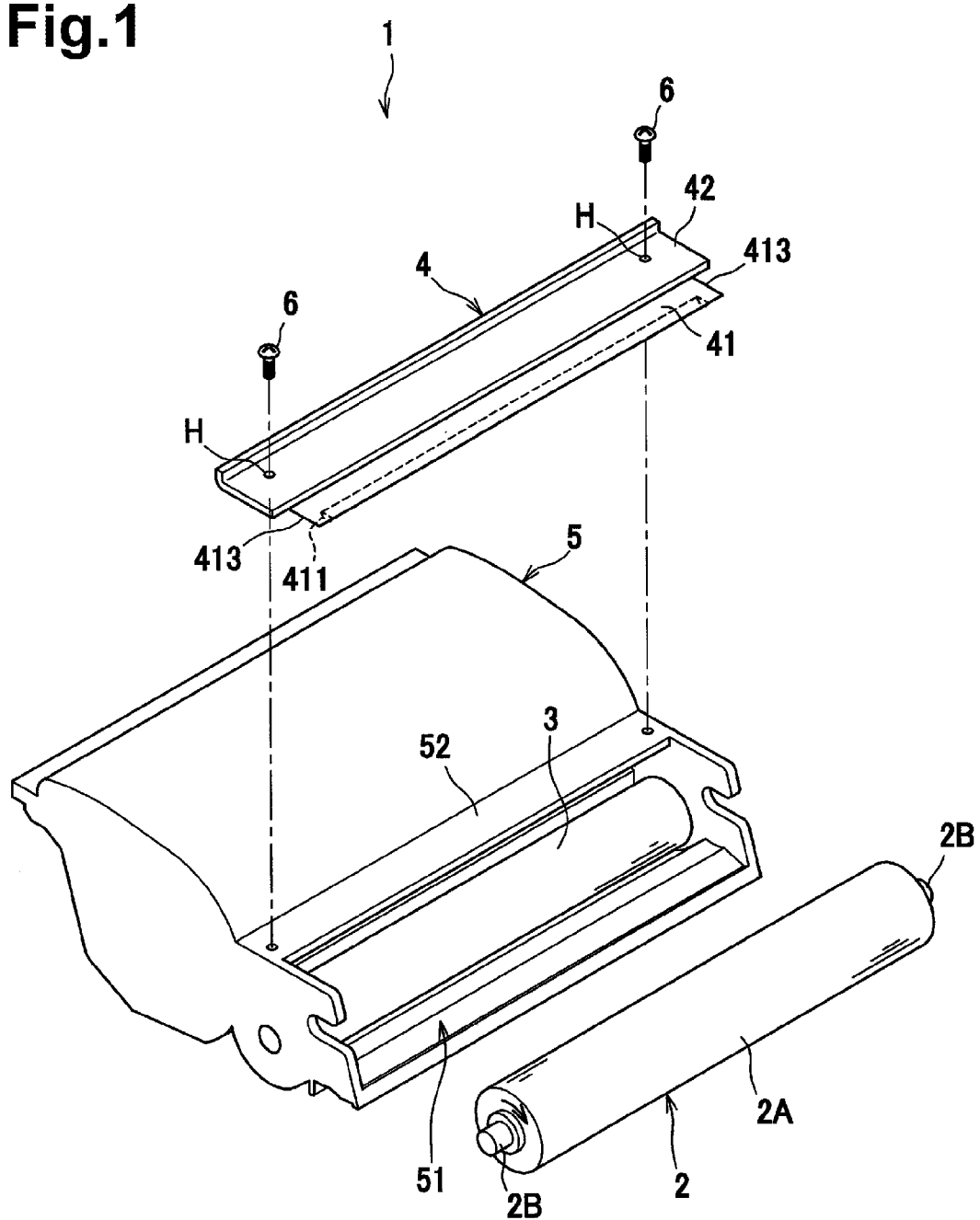
FIG. 1 is a disassembled perspective view depicting a developing device in an illustrative embodiment according to one or more aspects of the disclosure.

As depicted in FIG. 1, a developing device 1 may comprise a developing roller 2 (an example of a developer carrier), a supply roller 3, a blade unit (or blade assembly) 4, and a developing case 5 that may hold these components.

The developing case 5 may be a container having therein a toner storage chamber 53 capable of storing toner therein. The developing case 5 may also be formed to define an opening 51 in one of its surfaces. The developing case 5 may define an edge of the opening 51 and comprise a blade support surface 52 to which the blade unit 4 may be fixed.

Figure 2:
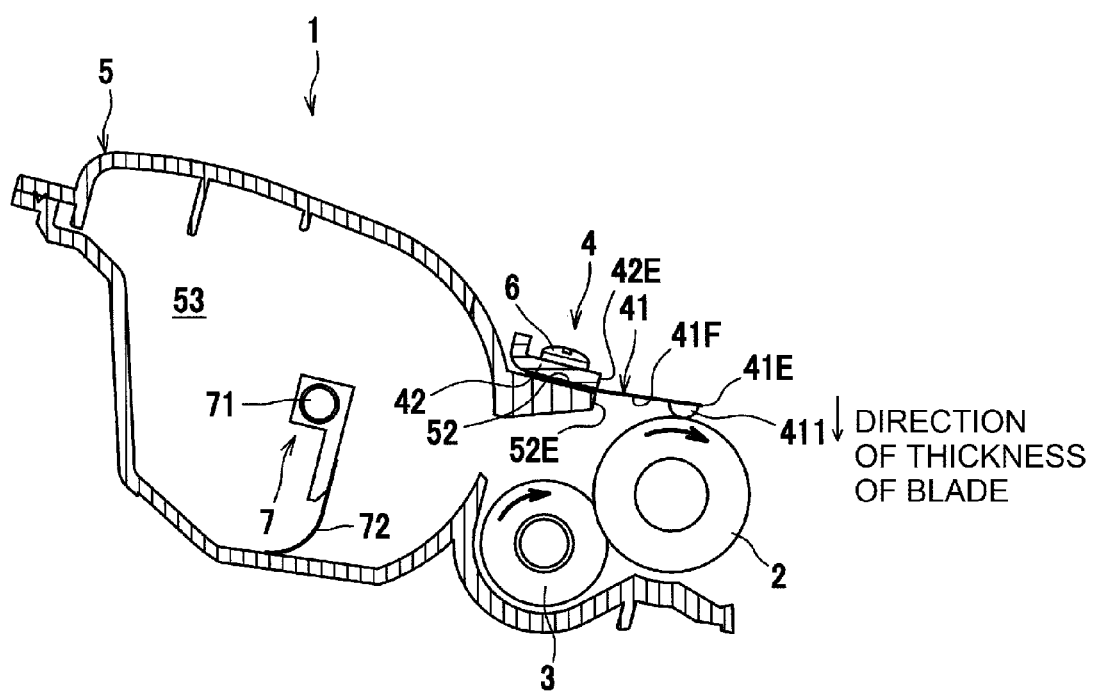
FIG. 2 is a sectional view depicting the developing device in the illustrative embodiment according to one or more aspects of the disclosure.

As depicted in FIG. 2, a conveyor member 7 for conveying toner toward the supply roller 3 may be disposed in the toner storage chamber 53. The conveyor member 7 may comprise a shaft portion 71 that may be rotatably supported by the developing case 5, and a film 72 (or other agitator) that may rotate along with rotation of the shaft portion 71.

As depicted in FIG. 1, the developing roller 2 may comprise a cylindrical roller body 2A and a shaft 2B that may be inserted into the roller body 2A and may rotatably interface with the roller body 2A. The roller body 2A may have elasticity and may be capable of holding toner on its cylindrical surface. The developing roller 2 may be disposed to close or partially close the opening 51 of the developing case 5. The shaft 2B may protrude from the roller body 2A in an axial direction of the developing roller 2 and may be rotatably supported by the developing case 5.

The supply roller 3 may be disposed inside the developing case 5 in contact with the developing roller 2, and may be rotatably supported by the developing case 5. The supply roller 3 may be configured to supply toner stored in the developing case 5 to the developing roller 2 as the developing roller 2 rotates.

The blade unit 4 may comprise a blade 41 and a supporting member 42. The blade 41 may be disposed near the developing roller 2 such that a tip of the blade 41 may be placed on the developing roller 2. The supporting member 42 may hold the blade 41.

The blade 41 may comprise sheet metal having an approximately rectangular shape (e.g., sheet metal having two longer sides and two shorter sides). The blade 41 may be positioned so that a longer side of the blade extends in a direction that an axis of the developing roller 2 may extend (hereinafter, this direction may be referred to as the longer direction LD (see FIG. 3A)). That is, a longer side of the blade 41 may be approximately parallel to the axial direction of the developing roller 2, and a shorter side of the blade 41 may be approximately perpendicular to the axial direction of the developing roller 2 (hereinafter, this approximately perpendicular direction may be referred to as the shorter direction SD (see FIG. 3A)). The blade 41 may be made of metallic material, for example, stainless steel. In other embodiments, for example, the blade 41 may comprise a sheet metal whose surface may have a coating including press oil.

For example, the blade 41 may have a thickness of 0.05 to 2.5 mm, a thickness of 0.05 to 0.12 mm, a thickness of 0.05 to 1.00 mm, a thickness of 0.07 to 0.15 mm, or a thickness of 0.08 to 0.12 mm. A longer dimension (e.g., a length) of the blade 41 (extending in the longer direction) may be greater than a dimension of the roller body 2A of the developing roller 2 in the axial direction. For example, the blade 41 may have a length of 218 to 270 mm, a length of 220 to 260 mm, or a length of 222 to 250 mm.

The blade 41 may comprise a contact portion 411, which may protrude toward the developing roller 2 and directly contact the roller body 2A of the developing roller 2. The contact portion 411 may protrude from a distal end 41E of a lower surface 41F (e.g., a surface facing the developing roller 2) of the blade 41 (see FIG. 2). The contact portion 411 may be made of, for example, rubber and may extend in the longer direction of the blade 41.

The supporting member 42 may be a member for fixing or otherwise holding a fixed end of the blade 41 to the developing case 5.

The supporting member 42 may be made of metallic material, for example, electrolytic zinc-coated carbon steel sheet. The supporting member 42 may have a thickness greater than the blade 41 and an approximately or substantially rectangular shape. A longer side of the supporting member 42 may be positioned so that it extends in a direction that is approximately parallel to the longer side of the blade 41. The supporting member 42 may extend so as to exceed both ends 413 of the blade 41. That is, the longer side of the supporting member 42 may be longer than the longer side of the blade 41.

The ends of the supporting member 42 may extend past the ends 413 of the blade 41. The supporting member 42 may extend over the blade 41 on a side opposite to the blade support surface 52 so that the supporting member 42 may pinch the blade 41 in conjunction with the blade support surface 52 of the developing case 5. In other words, the supporting member 42 and blade support surface 52 may be positioned such that the blade 41 is interposed therebetween. The blade 41 may be pinched between an edge 42E of the supporting member 42 and an edge 52E of the support surface 52. A portion, which may contact the edge 42E of the supporting member 42 and the edge 52E of the blade support surface 52, of the blade 41 may function as a fulcrum when the blade 41 bends.

The blade unit 4 configured as described above may be fixed to the developing case 5 using screws 6 through holes H in the blade 41 and the supporting member 42. In this state, the blade unit 4 may be configured to regulate a thickness of a toner layer attaching to the developing roller 2. In particular, the contact portion 411 of the blade 41, which may contact the rotating developing roller 2, may regulate a thickness of the toner layer by blocking excess toner from passing as the developing roller 2 rotates.

Figure 3A:
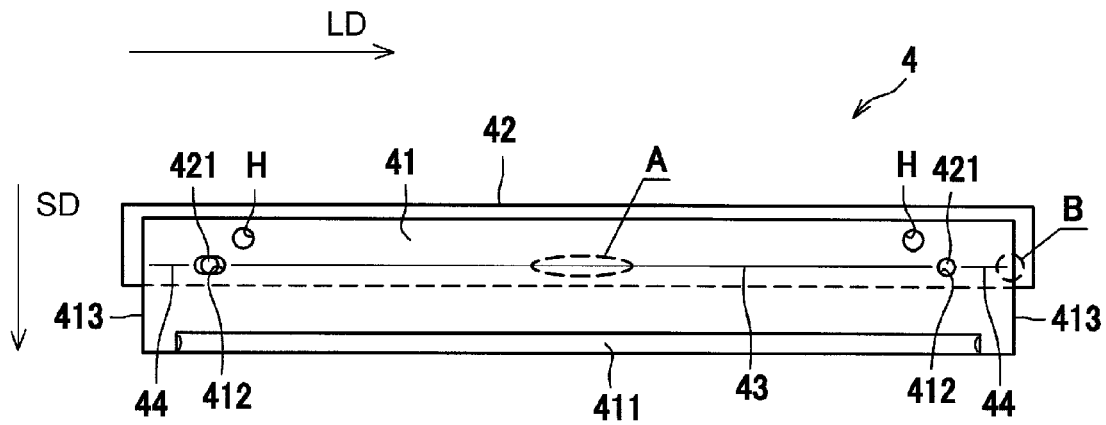
FIG. 3A illustrates a blade unit according to one or more aspects of the disclosure.

As depicted in FIG. 3A, the supporting member 42 may comprise a positioning protrusion 421, which may be engaged with the blade 41, e.g., at opposite end portions of the longer side of the blade 41. The positioning protrusion 421 may protrude from a surface of the supporting member 42 that faces the blade 41. As shown in the example embodiment of FIG. 3A, the blade 41 may have a pair of openings 412 that may be engaged with a pair of positioning protrusions 421. One of the pair of openings 412 may be a circular opening and the other of the pair of openings 412 may be an elongated opening. The elongated opening of the pair of openings 412 may absorb a dimensional deviation between the two openings 412 and linear expansion of the blade 41 and/or the supporting member 42 in the longer direction that may occur during welding. In other words, for example, the elongated opening 412 may be elongated in order for the blade 41 to stay engaged with one of the positioning protrusions 421 if the blade 41 expands as a result of welding. The blade 41 may be positioned with respect to the supporting member 42 by the engagement of the openings 412 and the corresponding positioning protrusions 421, respectively.

The blade 41 may be welded to the supporting member 42 at a plurality of locations along the blade 41 in the longer direction. More specifically, the blade 41 may be joined to the supporting member 42 by laser welding at multiple portions of the blade 41, including portions of the blade 41 at end portions of the blade 41, portions of the blade 41 between the positioning protrusions 421 and the ends 413 of the blade 41 and portions of the blade 41 between the positioning protrusions 421 themselves.

The blade 41 may have a first combined weld mark 43, which may join the blade 41 and the supporting member 42 at a position between the positioning protrusions 421, and second combined weld marks 44, which may join the blade 41 and the supporting member 42 at respective positions located towards an outer edge of the supporting member 42 from the respective positioning protrusions 421 in the longer direction.

The first combined weld mark 43 may extend from a vicinity of one of the openings 412 to a vicinity of the other of the openings 412 along the longer dimension of the blade 41.

Figure 3B:
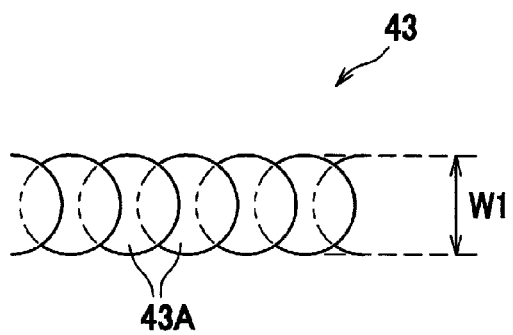
FIG. 3B is an enlarged view of a portion A of FIG. 3A according to one or more aspects of the disclosure.

As depicted in FIG. 3B, the first combined weld mark 43 may include a plurality of weld marks 43A that may be aligned along the longer direction of the blade 41, wherein adjacent weld marks of the plurality weld marks 43A may overlap each other. That is, the plurality of weld marks 43A that the blade 41 may have may partially overlap one another, thereby forming the combined weld mark 43. A weld mark may refer to a welded portion (e.g., a modified portion of the blade and/or supporting member) that may be formed by one continuous application (e.g., one pulse) of a laser beam.

Each weld mark 43A may have a shape and size corresponding to the shape and size (e.g., diameter) of the laser beam used to create the weld mark. The circular shape, as shown in the example of FIG. 3B, may include a circular shape in which a dimension of a most elongated portion (e.g., longest diameter) may be within a range of 110% to 330% of a dimension of a least elongated portion (e.g. shortest diameter). In other embodiments, for example, the dimension of the most elongated portion (e.g., longest diameter) may be within a range of 110% to 250%, a range of 100% to 120%, a range of 100% to 110%, a range of 101% to 105%, or a range of 101% to 115% of the dimension of the least elongated portion (e.g. shortest diameter). For example, the weld marks 43A may have a size of 0.1 to 0.4 mm.

The plurality of weld marks 43A may overlap on top of one another in an order in which the plurality of weld marks 43A may be arranged in the longer direction of the blade 41. For example, when creation of the weld mark 43A begins from the circular opening 412 side of the blade 41, a weld marks 43A formed further from the circular opening 412 may be formed over the adjacent weld mark 43A formed closer to the circular opening 412 (see dotted lines illustrated in FIG. 3B).

As depicted in FIG. 3A, the second combined weld marks 44 may extend from respective vicinities of the openings 412 to respective vicinities of the ends 413 of the blade 41 along the longer direction of the blade 41.

Figure 3C:
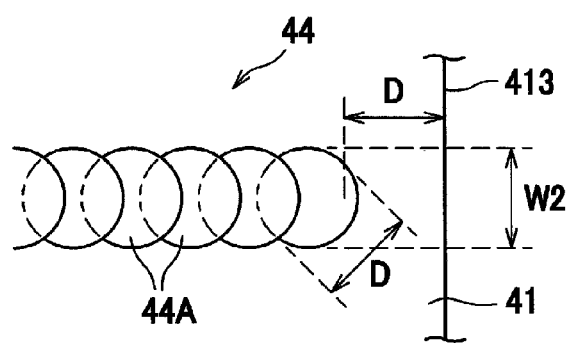
FIG. 3C is an enlarged view of a portion B of FIG. 3A according to one or more aspects of the disclosure.

In a similar manner to the first combined weld mark 43 depicted in FIG. 3C, each second combined weld mark 44 may include a plurality of circular weld marks 44A that may be arranged along the longer direction of the blade 41, and that may overlap with one another.

Of the weld marks 44A included in the second combined weld mark 44, the outermost ones of the weld marks 44A may be formed on the blade 41 along the longer direction of the blade 41 while a gap is left between edges of the outermost weld marks 44A and the ends 413 of the blade 41. The gap may be smaller than a nugget diameter D of the weld mark 44A.

As depicted in FIGS. 3B and 3C, the first combined weld mark 43 and the second combined weld marks 44 may have substantially the same dimension (e.g., a width) in the shorter direction of the blade 41. Comparing a dimension W2 (e.g., a width) in the shorter direction of the blade 41 of the outermost weld marks 44A included in one of the second combined weld marks 44 in the longer direction of the blade 41 with a dimension W1 (e.g., a width) in the shorter direction of the blade 41 of a middle weld mark 43A included in the first combined weld mark 43 in the longer direction of the blade 41, the dimension W2 of the outermost weld mark 44A of the second combined weld mark 44 may be 0.80 to 1.20 times as large as the dimension W1 of the middle weld mark 43A of the first combined weld mark 43. In other embodiments, for example, the dimension W2 of the outermost weld mark 44A of the second combined weld mark 44 may be 0.90 to 1.01 times, 0.85 to 1.25 times, or 0.90 to 1.1 times as large as the dimension W1 of the middle weld mark 43A of the first combined weld mark 43.

That is, the dimension W2 in the shorter direction of the blade 41 of one of the outermost weld marks of all the weld marks in the weld marks 43A and 44A formed on the blade 41 in the longer direction of the blade 41 may be 0.80 to 1.20 times as large as the dimension W1 in the shorter direction of the blade 41 of the middle weld mark of all the weld marks in the weld marks 43A and 44A formed on the blade 41 in the longer direction of the blade 41. In other embodiments, for example, the dimension W2 in the shorter direction of the blade 41 of one of the outermost weld marks of all the weld marks in the weld marks 43A and 44A formed on the blade 41 in the longer direction of the blade 41 may be 0.90 to 1.01 times, 0.85 to 1.25 times, or 0.90 to 1.1 times as large as the dimension W1 in the shorter direction of the blade 41 of the middle weld mark of all the weld marks in the weld marks 43A and 44A formed on the blade 41 in the longer direction of the blade 41.

The weld mark positioned at the middle of all the weld marks in the weld marks 43A and 44A formed on the blade 41 in the longer direction of the blade 41 may be determined as the middle weld mark. If there is no weld mark formed on the middle of the line of the weld marks, a weld mark formed at a position closest to the middle of the line of the weld marks in the longer direction of the blade 41 may be determined as the middle weld mark.

Hereinafter, advantages of the blade unit 4, configured in accordance with this disclosure, are described.

The weld marks 43A of the first combined weld mark 43 and the weld marks 44A of the second combined weld mark 44 formed on the blade have substantially the same size, thereby reducing or preventing an occurrence of variations in contact pressure between the blade 41 and the developing roller 2 when the blade 41 contacts the developing roller 2. Therefore, the quality of the blade unit 4 may be improved.

The blade 41 may be welded to the supporting member 42 while the slight gap that is smaller than the nugget diameter D is left between the edges of the outermost weld marks and the ends 413 of the blade 41 in the longer direction of the blade 41, whereby the blade 41 might not come off from the supporting member 42 easily.

Next, a manufacturing method of the blade unit 4 is described.

Figure 4A:
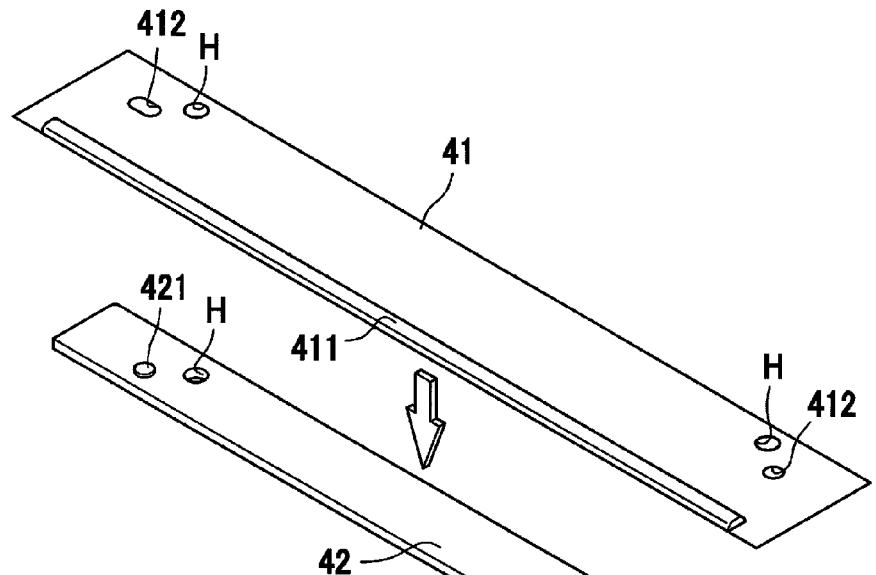
FIG. 4A is a diagram for explaining a preparation process in a developing device manufacturing method according to one or more aspects of the disclosure.

When the blade unit 4 is assembled, as depicted in FIG. 4A, the blade 41 may first be placed on the supporting member 42 (e.g., a preparation process). At that time, the openings 412 in the blade 41 may be engaged with the corresponding positioning protrusions 421 of the supporting member 42.

Figure 4B:
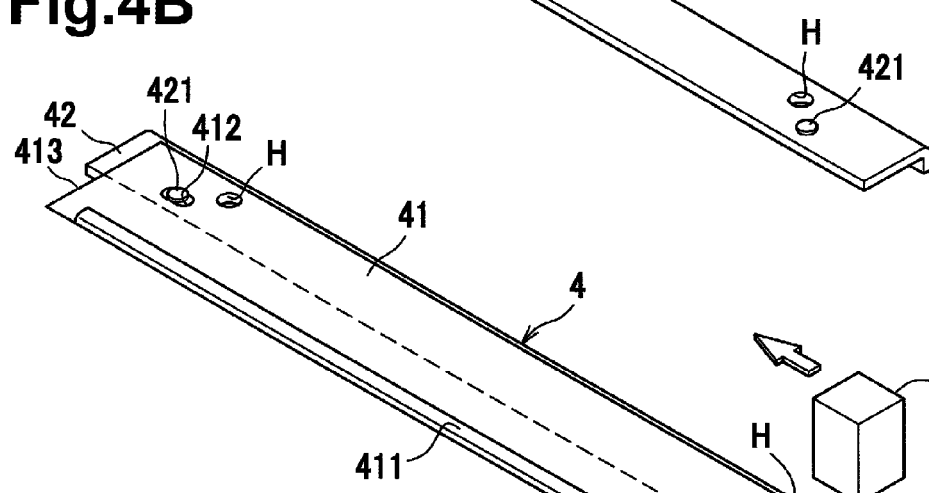
FIG. 4B is a diagram for explaining a welding process in the developing device manufacturing method according to one or more aspects of the disclosure.

Then, the blade 41 and the supporting member 42 may be fastened on a worktable. Thereafter, as depicted in FIG. 4B, while a laser beam 81 irradiated from the welding machine 8 is moved with respect to the blade 41, the laser beam 81 may be irradiated onto the blade 41 to weld the blade 41 and the supporting member 42 to each other (e.g., a welding process).

In some embodiments, the welding machine 8 may be configured to irradiate a portion, which may face the welding machine 8, of an object with a pulsed laser. That is, pulses of the laser beam 81 may be emitted. In other embodiments, for example, another welding machine that may be configured to irradiate the blade 41 with a laser beam by moving a reflector provided inside the welding machine, without moving the welding machine itself, may be used. For example, an yttrium aluminum garnet ("YAG") laser or a fiber laser may be used as the pulsed laser. In particular, a fiber laser (which emits a laser beam with a relatively small diameter) may be used so that the welding process for creating overlapping weld marks does not cause overheating and/or deformation of the blade 41 and/or the supporting member 42.

In the welding process, the laser beam 81 may be moved with respect to the blade 41 along the longer direction of the blade 41 from one end portion, in which the circular opening 412 may be defined, to the other end portion, in which the elongated opening 412 may be defined. More specifically, the laser beam 81 may be moved with respect to the blade 41 along the longer direction of the blade 41 from a position more outside than the one end 413 of the blade 41 to a position more outside than the other end 413 of the blade 41.

At that time, the welding machine 8 may be moved at a speed which may allow formation of adjacent weld marks 43A or weld marks 44A that may overlap each other when the laser beam 81 is irradiated onto the blade 41.

Figure 4C:
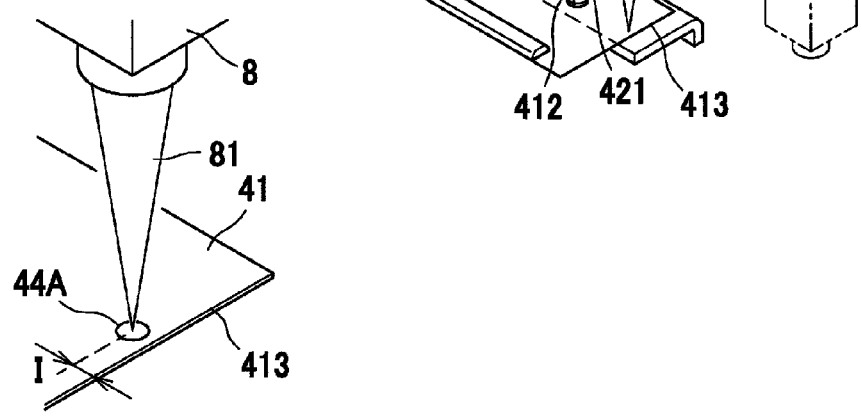
FIG. 4C is an enlarged view of a portion onto which a laser beam is irradiated, in the blade, according to one or more aspects of the disclosure.

The welding machine 8 may be moved first and the laser beam 81 may be then irradiated onto the blade 41. More specifically, as depicted in FIG. 4C, the laser beam 81 may be irradiated onto the blade 41 when the center of the laser beam 81 reaches a position a predetermined distance I inside from the one end 413 of the blade 41 while the laser beam 81 is moved from the outside to the inside of the blade 41 with respect to the one end 413 located close to the circular opening 412. The predetermined distance I may be longer than or equal to a half of the nugget diameter D and shorter than the nugget diameter D.

While the welding machine 8 is moved, the irradiation of the laser beam 81 may be stopped. Thus, the movement of the welding machine 8 may be stopped after the irradiation of the laser beam 81 is stopped. More specifically, the irradiation of the laser beam 81 may be stopped when the center of the laser beam 81 reaches a position the predetermined distance I inside the other end 413 of the blade 41 while the laser beam 81 is moved from the inside to the outside of the blade 41 with respect to the other end 413 located close to the elongated opening 412.

According to the above-described manufacturing method, while the laser beam 81 is irradiated onto the blade 41, the laser beam 81 moves with respect to the blade 41 at a constant speed. Therefore, the weld marks 43A and 44A having substantially the same size may be formed across the blade 41 in the longer direction of the blade 41.

Starting the welding from the circular opening 412 side as described above may allow the elongated opening 412 to absorb a thermal expansion of the blade 41 that may occur during welding.

While the disclosure has been described in detail with reference to the example drawings, it is not limited to such examples. Various changes, arrangements, and modifications may be realized without departing from the spirit and scope of the disclosure. In the description below, common parts have the same reference numerals as those of the above-described embodiments, and the detailed description of the common parts is omitted.

Figure 5A:
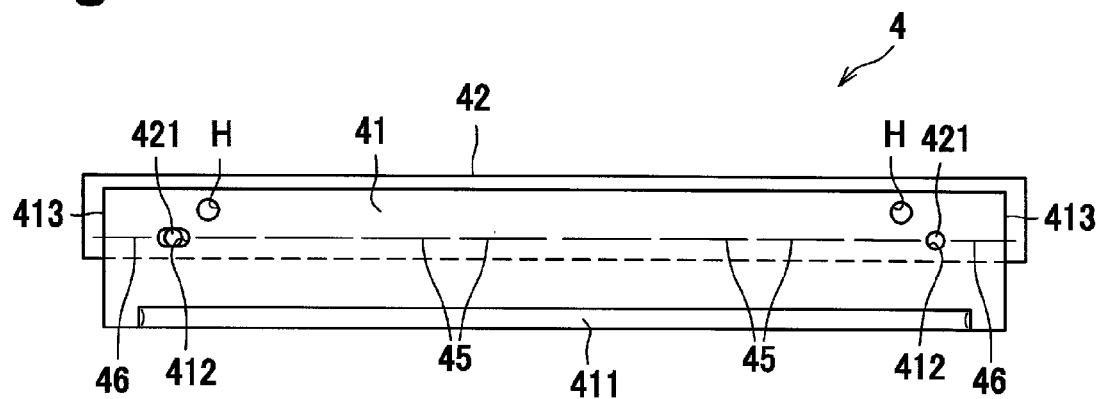
FIG. 5A illustrates a blade unit in a first variation according to one or more aspects of the disclosure.

As described above, the blade 41 may be welded to the supporting member 42 while the slight gap that is smaller than the nugget diameter D is left between the edges of the outermost weld marks and the ends 413 in the longer direction. However, the configuration of the blade 41 might not be limited to that example. In other embodiments, for example, as depicted in FIG. 5A, a portion of each end 413 of the blade 41 in the longer direction of the blade 41 may be welded to the supporting member 42.

More specifically, the blade 41 may have a plurality of third weld marks 45 between the positioning protrusions 421 along the longer direction of the blade 41 and fourth weld marks 46 at respective positions located towards an outer edge of the supporting member 42 from the respective positioning protrusions 421 in the longer direction.

Figure 5B:
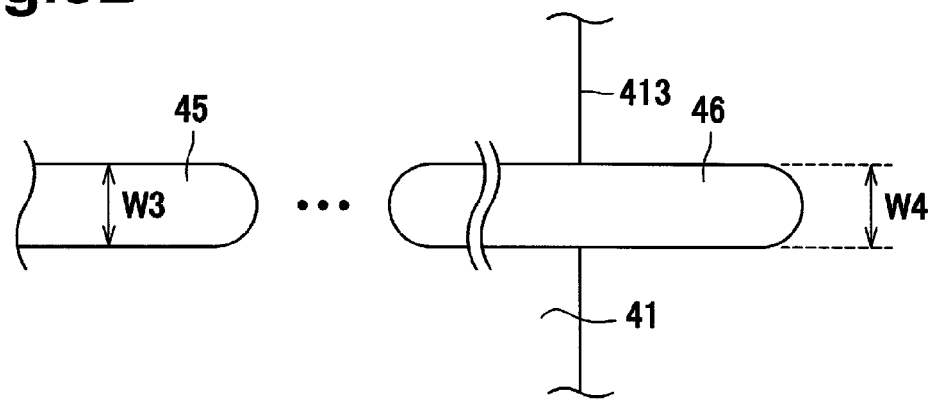
FIG. 5B is an enlarged view of weld marks in the first variation according to one or more aspects of the disclosure.

As depicted in FIG. 5B, the weld marks 45 and 46 may be formed on the blade 41 using a continuous wave laser such as a fiber laser and extend along the longer direction of the blade 41.

The fourth weld marks 46 may extend from the inside to the outside of the blade 41 beyond the respective ends 413 of the blade 41 in the longer direction of the blade 41, and may thus be formed on respective portions of the supporting member 42 where there may be no blade 41.

The fourth weld mark 46 may have a dimension W4 (e.g., a width) in the shorter direction of the blade 41. The dimension W4 of the fourth weld mark 46 may be a dimension in the shorter direction of the blade 41 of an outer end portion of an outermost fourth weld mark 46 in the longer direction of the blade 41. The dimension W4 of the fourth weld mark 46 in the shorter direction of the blade 41 may be 0.8 to 1.2 times as large as a dimension W3 (e.g., a width) of one of the third weld marks 45 in the shorter direction of the blade 41.

The blade unit 4 configured as described above may have thereon the weld marks 45 and 46 that may have substantially the same width in the shorter direction of the blade 41, thereby improving the quality of the blade unit 4 as in the case of the illustrative embodiment.

The portions of the ends 413 of the blade 41 may be welded to the supporting member 42. As in the case of the illustrative embodiment, the blade 41 therefore might not come off from the supporting member 42 easily.

To assemble the blade unit 4 configured as described above, in the welding process, the irradiation of the laser beam 81 may be started before the center of the laser beam 81 reaches the end 413 located close to the circular opening 412 in the blade 41. The irradiation of the laser beam 81 may be continued until the center of the laser beam 81 passes the end 413 located close to the circular opening 412 in the blade 41.

The irradiation of the laser beam 81 may be started before the center of the laser beam 81 reaches the end 413 located close to the elongated opening 412 in the blade 41. The irradiation of the laser beam 81 may be continued until the center of the laser beam 81 passes the end 413 located close to the elongated opening 412 in the blade 41.

Figure 6:
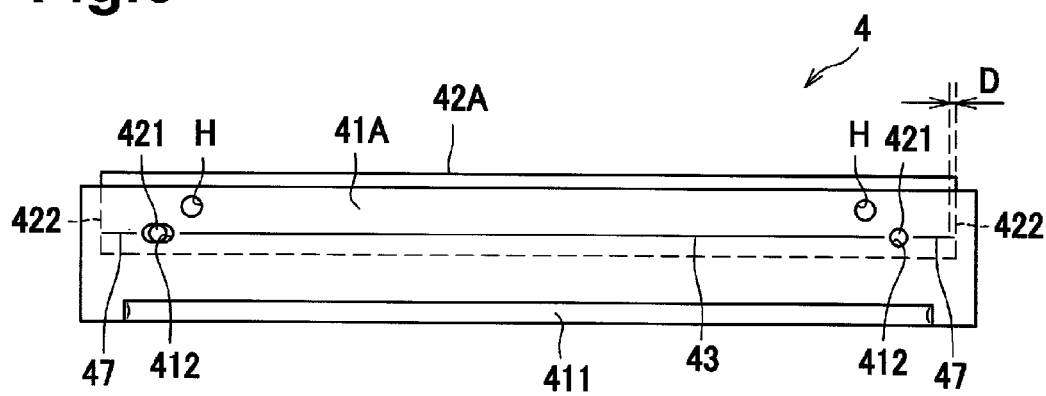
FIG. 6 illustrates a blade unit in a second variation according to one or more aspects of the disclosure.

As described above, the blade 41 may be welded to the supporting member 42 in the vicinities of the ends 413 in the longer direction of the blade 41. However, the configuration of the blade unit 4 might not be limited to that example. In other embodiments, for example, as depicted in FIG. 6, in a case where the supporting member 42 is shorter in length than the blade in the longer direction of the blade 41, the second weld marks 47 may be formed inside of respective ends 422 of the supporting member 42 and towards the outer edges of the blade 41 from the respective positioning protrusions 421 in the longer direction of the blade 41. The supporting member 42 may be welded to the blade 41 while the slight gap that is smaller than the nugget diameter D is left between the second weld marks and the ends 422 of the blade 41 in the longer direction of the blade 41.

Figure 7:
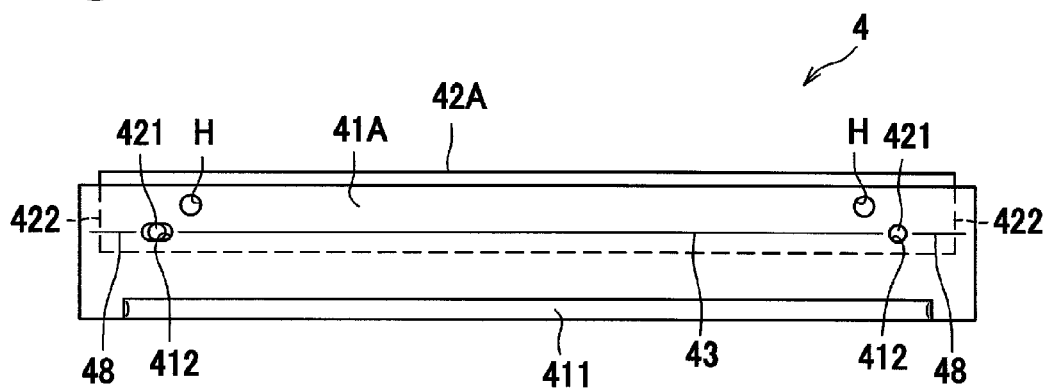
FIG. 7 illustrates a blade unit in a third variation according to one or more aspects of the disclosure.

In still other embodiments, as depicted in FIG. 7, the fourth weld marks 48 may be formed over the respective ends 422 of the supporting member 42 in the longer direction of the blade 41 and towards the respective outer edges of the blade 41 from the respective positioning protrusions 421 in the longer direction of the blade 41. The portions of the ends 422 of the supporting member 42 may be welded to the blade 41 in the longer direction of the blade 41.

As described above, the weld marks 43A may overlap one another to form the combined weld mark 43 on the blade 41 and the weld marks 44A may overlap one another to form the combined weld mark 44 on the blade 41. However, the manner of arranging the weld marks might not be limited to that example. In other embodiments, for example, the blade 41 may have circular weld marks that may be spaced apart from each other.

As described above, in the welding process, the laser beam 81 may be moved with respect to the blade 41. However, the manner of moving the laser beam 81 with respect to the blade 41 might not be limited to that example. In other embodiments, for example, the blade 41 and the supporting member 42 may be moved with respect to the laser beam 81 and the laser beam 81 may be stationary.

In still other embodiments, the laser beam 81 and the set of the blade 41 and the supporting member 42 may be moved at the same time.

Figure 8:
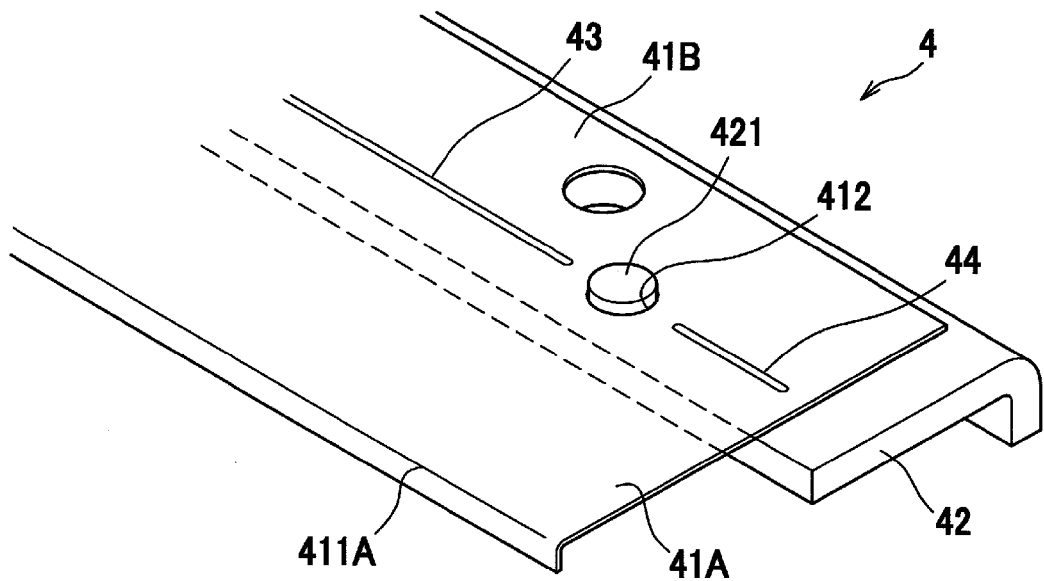
FIG. 8 illustrates a blade unit in a fourth variation according to one or more aspects of the disclosure.
Figure 9:
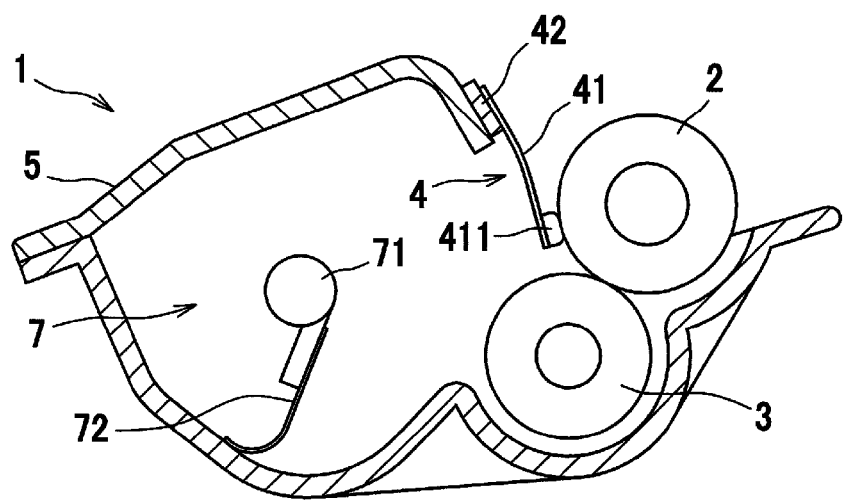
FIG. 9 illustrates a blade unit in a fifth variation according to one or more aspects of the disclosure.

As described above, the contact portion 411 may be formed on the blade 41 to protrude from the blade 41. However, the configuration of the blade 41 might not be limited to that example. In other embodiments, for example, as depicted in FIG. 8, the blade 41A might not comprise a contact portion made of, for example, rubber, but may comprise a bent portion 411A in which the distal end portion of the blade 41A may be bent toward the supporting member 42 (e.g., toward a side opposite to the developing roller 2). The bent portion 411A (e.g., the distal end of the blade 41) may directly contact the roller body 2A of the developing roller 2.

As described above, the distal end portion of the blade 41 may be placed on the developing roller 2, and the blade 41 may be pinched by the supporting member 42 and the developing case 5. However, the configuration of the blade unit 4 might not be limited to that example. In other embodiments, for example, as depicted in FIG. 12, the supporting member 42 to which the blade 41 may be welded may be fixed to the developing case 5 directly while the supporting member 42 is pinched by the blade 41 and the developing case 5. In the blade unit 4, the distal end portion of the blade 41 (e.g., the contact portion 411) may contact the developing roller 2 from the conveyor member 7 side, and the surface, which may be opposite to the surface 41F having the contact portion 411 thereon, of the blade 41 may be supported by the supporting member 42.

As described above, the developing roller 2 comprising the roller body 2A and the shaft 2B are illustrated as the developer carrier. However, in other embodiments, the developer carrier might not be limited to that example. In other embodiments, for example, a brush roller, a developing sleeve, or a belt-shaped developer carrier may be adopted as the developer carrier.

As described above, the contact portion 411 (e.g., the distal end) of the blade 41 may be in direct contact with the roller body 2A of the developing roller 2 (as an example of the developer carrier). However, the configuration of the blade might not be limited to that example. In other embodiments, for example, the blade may be disposed such that its distal end portion may be substantially 0.1-1.0 mm apart from the roller body 2A.

As described above, stainless steel may be used as the metallic material for the blade 41. However, the material of the blade 41 might not be limited to that example. For example, the blade 41 may be made of, for example, steel used for springs, phosphor bronze, beryllium copper, or carbon tool steel. In a case where the steel used for springs or the carbon tool steel is used, a nickel, chromium, or zinc coating may be applied to the blade 41 to prevent or reduce rust.

As described above, the electrolytic zinc-coated carbon steel sheet may be used as the metallic material for the supporting member 42. However, the configuration of the supporting member 42 might not be limited to that example. In other embodiments, for example, the supporting member 42 may be made of a cold rolled steel plate or a tin plate, or a plate made of one of the cold rolled steel plate and the tin plate whose surface may be applied with treatment such as Parkerizing, chromating, or nickel coating. The supporting member 42 may also have a coating including press oil thereon.

What is claimed is:

1. A method for welding a developing blade to a supporting member, the method comprising:
   increasing, by a welding apparatus, a movement speed of a welding laser from a first position to a second position, wherein the first position is disposed outside of the developing blade in a direction of movement of the welding laser and the second position is located within the developing blade in the direction of movement of the welding laser, wherein the laser is stationary at the first position;
   upon the welding laser reaching the second position:
      maintaining the movement speed of the welding laser; and
      initiating irradiation of the welding laser toward the developing blade and the supporting member.

2. The method of claim 1, further comprising, upon the welding laser reaching a third position, halting the irradiation of the welding laser and initiating a decrease in the movement speed of the welding laser.

3. The method of claim 1, wherein irradiation of the welding laser includes:

forming a weld mark on the developing blade connecting the developing blade to the supporting member, wherein the weld mark is an initial weld mark from an edge of the developing blade in the direction of movement of the welding laser, wherein the weld mark is formed with a diameter greater than a distance between the weld mark and the edge of the developing blade in the direction of movement of the welding laser, and wherein the distance between the weld mark and the edge of the developing blade in the direction of movement of the welding laser is greater than a radius of the weld mark.

4. The method of claim 1, wherein irradiation of the welding laser includes:

forming a first weld mark on the developing blade connecting the developing blade to the supporting member at a first position, wherein the first weld mark is formed with a first width in a direction perpendicular to the movement direction of the welding laser; and forming a second weld mark on the developing blade connecting the developing blade to the supporting member at a second position, wherein the second weld mark is formed with a second width in the direction perpendicular to the movement direction of the welding laser, wherein the first position is on a first side of an opening of the developing blade in the direction of movement of the welding laser, wherein the second position is on a second side of the opening of the developing blade in the direction of movement of the welding laser, and wherein the first width is between 0.8 and 1.2, inclusive, times as large as the second width.

5. A method for welding a developing blade to a supporting member, the method comprising:

forming, by a welding laser of a welding apparatus, a first weld mark at a first position on the developing blade to connect the developing blade to the supporting member, wherein the first weld mark is an initial weld mark from an edge of the developing blade in a movement direction of the welding laser, and wherein the first weld mark is formed with a first width in a direction perpendicular to the movement direction of the welding laser; and forming a second weld mark at a second position of the developing blade to connect the developing blade to the supporting member, wherein the second position is a central position along the developing blade in the movement direction of the welding laser, and wherein the second weld mark is formed with a second width in the direction perpendicular to the movement direction of the welding laser, wherein the first width is between 0.8 and 1.2, inclusive, times as large as the second width.

6. A method for welding a developing blade to a supporting member, the method comprising:

increasing a relative movement speed of a welding laser and a developing blade, along a moving direction;

upon the welding laser reaching the developing blade:
maintaining the relative movement speed; and
initiating irradiation of the welding laser toward the developing blade and the supporting member.

7. The method of claim 6, further comprising, upon the welding laser reaching a predetermined position, halting the irradiation of the welding laser and initiating a decrease in the movement speed of the welding laser.

8. The method of claim 6, wherein irradiation of the welding laser includes:

forming a weld mark on the developing blade connecting the developing blade to the supporting member, wherein the weld mark is an initial weld mark from an edge of the developing blade in the direction of movement of the welding laser, wherein the weld mark is formed with a diameter greater than a distance between the weld mark and the edge of the developing blade in the direction of movement of the welding laser, and wherein the distance between the weld mark and the edge of the developing blade in the direction of movement of the welding laser is greater than a radius of the weld mark.

* * * * *